United States Patent [19]

Weeks et al.

[11] Patent Number: 5,215,137
[45] Date of Patent: Jun. 1, 1993

[54] SAFETY TIRE AND TAKE-APART WHEEL CONSTRUCTION

[75] Inventors: J. Bruce Weeks, Eaton Rapids; Michael R. Bernard, East Lansing; Danny M. O'Rourke, Haslett, all of Mich.

[73] Assignee: Motor Wheel Corporation

[21] Appl. No.: 769,000

[22] Filed: Sep. 30, 1991

Related U.S. Application Data

[63] Continuation-in-part of Ser. No. 602,644, Oct. 24, 1990, abandoned, which is a continuation-in-part of Ser. No. 432,163, Nov. 6, 1989, Pat. No. 5,022,450.

[51] Int. Cl.$^5$ .............................................. B60B 25/00
[52] U.S. Cl. .............................. 152/379.4; 152/381.5; 152/427; 152/520
[58] Field of Search ............... 152/379.3, 379.4, 379.5, 152/381.3, 381.4, 381.5, 381.6, 382, 383, 396, 400, 415, 427, 516, 520, 429, DIG. 16

[56] References Cited

U.S. PATENT DOCUMENTS

| | | | |
|---|---|---|---|
| 2,608,235 | 8/1952 | Wyman | 152/427 X |
| 2,652,858 | 9/1953 | Snyder | 152/427 X |
| 2,765,835 | 10/1956 | Pavkov | 152/427 |
| 2,802,507 | 8/1957 | Clark . | |
| 2,871,905 | 2/1959 | Stanton . | |
| 3,191,654 | 6/1965 | Anderson et al. | 152/427 X |
| 3,306,331 | 2/1967 | Cherniaew | 152/427 X |
| 3,864,170 | 2/1975 | Mitchell . | |
| 3,880,219 | 4/1975 | Mitchell . | |
| 3,885,615 | 5/1975 | Mitchell . | |
| 4,102,379 | 7/1978 | Kamiya . | |
| 4,106,543 | 8/1978 | Sano . | |
| 4,216,810 | 8/1980 | Osada et al. . | |
| 4,228,840 | 10/1980 | Okada . | |
| 4,258,767 | 3/1981 | Wilde | 152/520 X |
| 4,327,791 | 5/1982 | Strader . | |
| 4,372,365 | 2/1983 | Osada et al. | 152/158 |
| 4,407,348 | 10/1983 | Suckow . | |
| 4,481,997 | 11/1984 | Strader . | |
| 4,662,419 | 5/1987 | Winfield | 152/381.6 |
| 4,823,854 | 4/1989 | Payne et al. | 152/382 |
| 4,836,261 | 6/1989 | Weeks et al. . | |
| 5,000,241 | 3/1991 | Patacell | 152/382 |

FOREIGN PATENT DOCUMENTS 541988 10/1955 Belgium .
1075964 5/1955 Fed. Rep. of Germany .

OTHER PUBLICATIONS

SAE Technical Paper Series, No. 880694, Feb. 29–Mar. 4, 1988 Author: J. Bruce Weeks.

Primary Examiner—Russell D. Stormer
Attorney, Agent, or Firm—Barnes, Kisselle, Raisch, Choate, Whittemore & Hulbert

[57] ABSTRACT

A take-apart tire and wheel assembly including a multipiece wheel rim having axially spaced bead flanges, a rim base, and a pneumatic tubeless tire, preferably adapted to removably receive in its tire inflation chamber a safety runflat insert. The wheel assembly also includes a safety vent for preventing inflation of the tire cavity in the event of improper assembly or disassembly of the safety tire and wheel assembly, including an O-ring seal disposed between opposing portions of rim segments of the wheel assembly, and mounting studs and associated nuts that releasably clamp the rim segments together with the O-ring captured in compression therebetween. The outboard wheel rim segment includes a wheel mounting disc and also a safety inflation valve coupling fixed to the outboard rim segment. The rim segment and coupling each have a through passageway and together define an interior air passage which communicates with the tire cavity. At least one of the through passageways is permanently connected to the rim segment and has a safety control cross sectional configuration adapted to prevent passage therethrough of an air inflation valve provided on an inner tube of sufficient size to fit within said tire cavity and capable when inflated of rendering said wheel and tire assembly normally operable for supporting its normal vehicle load in a run-mode of the vehicle. The safety inflation valve coupling and rim segment are thus operable to prevent insertion of such an inner tube valve through the one passageway permanently rim-connected. The coupling itself may be permanently or removably connected to the rim segment.

27 Claims, 7 Drawing Sheets

SAFETY TIRE AND TAKE-APART WHEEL CONSTRUCTION

This application is a continuation-in-part of co-pending application Ser. No. 07/602,644 filed Oct. 24, 1990 now abandoned which in turn is a continuation-in-part of application Ser. No. 07/432,163, filed Nov. 6, 1989, now U.S. Pat. No. 5,022,450 issued Jun. 11, 1991.

FIELD OF THE INVENTION

The present invention is directed to wheel assemblies for tubeless pneumatic tires of a type adapted for continued operation upon lowering or loss of air pressure in the tire, and more particularly to assemblies of the described type which include a safety insert device disposed internally of the tire for supporting the tire tread in the deflated condition. The invention also relates to take-apart safety wheel assemblies of the type having removable or separable flange rings for mounting or demounting of a tubeless pneumatic tire thereon and to structure for sealing and inflating such split-type wheels upon assembly of the rim and wheel parts after mounting the tire on the disassembled rim part, and vice-versa.

BACKGROUND OF THE INVENTION

It has long been the practice in the construction of wheels for trucks and other heavy duty highway or off-highway vehicular equipment, including military vehicles, to provide a "multi-piece" type or a "take-apart" type wheel assembly, each type utilizing a rim of the split-type in order to facilitate the mounting or demounting of heavy duty tubeless pneumatic tires thereon. In such multi-piece and take-apart wheels, it has also been conventional to employ a sealing member, such as an O-ring or other sealing ring having especially contoured cross-sectional configurations, which is interposed between the removable flange ring and the other disc and rim parts of the wheel to seal the tire and rim to maintain the necessary air tightness between them.

Take-apart wheels are an integral part of several systems designed to provide enhanced mobility for army pneumatic tire vehicles, such as the High Mobility Multi-Purpose Wheeled Vehicle (HMMWV). Such wheels provide the ability to insert devices into the tire cavity for run-flat capability or bead lock to prevent tire bead unseating when operated at the low inflation pressure as necessary for soft soil floatation.

The difference between a "Take-apart" type wheel and the more common multi-piece, lock ring and gutter style of wheel is that the former is a bolt-together type of wheel. This allows repeated assembly/disassembly with common hand tools. It also provides a means of axially compressing the tire beads against a bead locking device which simulates inflation pressure sufficient to prevent bead unseating under low or no inflation pressure conditions.

Figure 9:
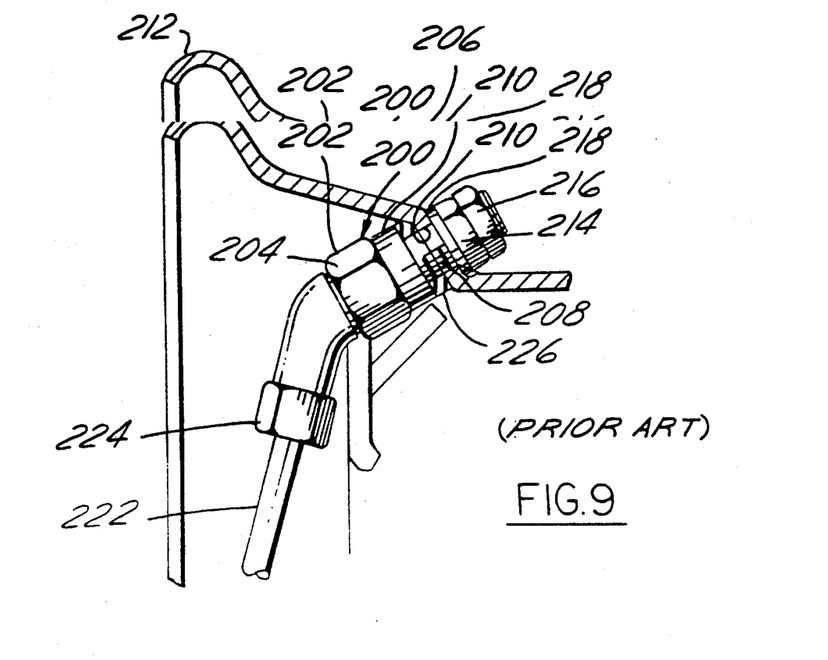
FIG. 9 is a fragmentary, part elevational, part cross-sectional view illustrating a prior art tire inflation valve coupling structure removably mounted through a circular opening in a rim of a prior art wheel construction adapted for use on a military vehicle provided with CTIS equipment.

In order to be able to insert either run-flat or bead lock devices into the tire cavity, the tire must be of the tubeless type. This requires the two rim halves of the take-apart wheel to be sealed to prevent air loss. Several seal types have been utilized experimentally, but the easiest and least expensive has been found to be the common O-ring type of seal. To meet the demand for U.S. Army mobility requirements for varying tire inflation pressures, depending upon terrain conditions, vehicle manufacturers have developed Central Tire Inflation Systems (CTIS) which allow the crew to change the inflation pressure in a few minutes without leaving the vehicle cab. This is accomplished by an on-board compression valving and piping system with an on-dash control switch. One prior art example of a removable air inflation adapter provided for military take-apart wheels for CTIS use is illustrated in FIG. 9 of the drawings herein and described in detail hereinafter.

For further details regarding various facets of take-apart wheels for high mobility military applications, reference may be made to SAE Technical Paper No. 880694 entitled "Take-Apart Wheels for High Mobility Military Applications" by J. Bruce Weeks of Motor Wheel Corporation presented at the SAE International Congress and Exposition, Detroit, Mich. on Feb. 29—Mar. 4, 1988.

Examples of improvements in such prior art take-apart wheels with sealing members may be found in the following prior art U.S. Patents assigned of record to the assignee herein, namely, Strader U.S. Pat. No. 4,327,791; Strader U.S. Pat. No. 4,481,997; Payne et al U.S. Pat. No. 4,823,854; and Weeks et al U.S. Pat. No. 4,836,261. These patents disclose take-apart military vehicle wheels employing O-ring sealing and adapted to be equipped with a safety insert device disposed internally of a tubeless tire mounted on the rim for supporting the tire tread in a deflated condition to thereby provide a so-called "run-flat" wheel construction. Also of general interest to show the state-of-the art in take-apart wheels disclosing various tire air inflation structures, the following prior art patents may be noted:

U.S. Pat. No. 2,802,507
U.S. Pat. No. 2,871,905
U.S. Pat. No. 3,880,219
U.S. Pat. No. 4,102,379
U.S. Pat. No. 4,372,365
U.S. Pat. No. 4,407,348
Belgium Patent No. 541,988
German Patent No. 1,075,964

In safety tire and wheel assemblies which include inserts of the described type, the insert conventionally comprises a base portion disposed adjacent the wheel rim and a second portion projecting radially from the rim into the tire cavity or chamber. Upon loss of air pressure in the chamber, the tire tread collapses against the second portion of the insert such that the insert supports the tire tread with respect to the rim for continued operation of the vehicle. Alternatively, the insert may comprise merely a base portion adapted to operate as a so-called "bead-lock" to prevent slippage of the tire beads relative to the rim bead seats and tire bead retaining flanges under high torque and/or low inflation pressure conditions, and/or to prevent loss of the tire from the rim under such conditions.

The aforementioned Strader '997 patent also discloses and claims an important safety feature useful in a multi-piece wheel rim assemblies, whether considered alone or in combination with safety inserts of the above-described type, which overcomes a significant safety hazard if it is attempted to inflate a tire mounted thereon when the various wheel assembly components are improperly positioned or seated, or to disassemble the rim when the tire mounted thereon has not been completely deflated. In the Strader '997 patent wheel construction, the disc and inboard rim part are made as one piece, and the O-ring is captured between a shoulder, at the junction of the disc with the inboard rim part, and an upturned flange at the inner edge of the outboard rim part.

Safety vent means, such as a groove or aperture in the disc-inboard rim piece, is located on the outboard side of the seal when in assembled position. Such safety vent means is operative to prevent inflation of a tire mounted on a wheel assembly when the wheel assembly components are improperly positioned and/or to automatically vent the tire cavity to atmosphere prior to disconnection of the outboard rim part should disassembly be attempted when the tire mounted thereon is still fully or partially inflated.

In the aforementioned Weeks et al '261 patent such safety a bleed means comprises a shoulder radius on the disc between the central wheel mounting portion of the disc and the outer surface of the outer marginal flange of the disc. The O-ring seal is displaceable by a tire interior air pressure axially along the disc outer surface onto the disc shoulder radius to thereby lose sealing engagement with the sealing surfaces to allow complete tire deflation as the wheel assembly nuts are loosened but while still engaged with their associated threaded studs.

One safety problem remains with such wheels when made to heavy duty military specifications which has thus far prevented their use in non-military applications, namely, the relatively large diameter rim hole provided to mount the military-specified inflation valve hardware or tubeless snap-in valves, such as the prior art removable CTIS adapter shown in FIG. 9. When this adapter is removed from the disc or rim the exposed valve hole is large enough to permit insertion therethrough of the built-in inflation valve of an inner tube, enabling the same to be improperly utilized as a "field fix" to salvage or prolong the use of a damaged tubeless tire mounted on the wheel. Although this unsafe practice is not condoned in military usage, it must be prevented if such take-apart wheels are to be made and marketed for commercial usage in order to prevent the safety air bleed feature of take-apart wheels from being improperly defeated in the field by the aforementioned inner tube "fix".

More particularly, it is not uncommon in commercial applications that, when a tubeless tire is damaged, such as by a side wall cut, the vehicle operator or service mechanic will make a "field fix" by installing an inner tube in the otherwise tubeless pneumatic tire so that the tire can continue in service even though damaged. However, when this fix is employed with a take-apart wheel, a dangerous condition is thereby created because the inner tube inside the tire defeats the O-ring air escape safety feature described previously hereinabove. Since automatic deflation of the tubeless tire upon initial partial disassembly of the wheel is no longer assured, the outboard demountable disc and/or rim part can be forceably blown off the remaining wheel and tire parts during wheel disassembly by the bead expansion force of the inflated inner tube, thereby creating a potential hazard which may cause injury to person and property. In other words, if an inner tube is installed in a tubeless tire on such a wheel, there is no safety air escape to deflate an inflated inner tube and hence, if not properly fully deflated, its expansion force can cause the wheel to fly apart during disassembly even though the interior tire cavity may be safety vented to atmosphere.

The aforementioned "inner tube fix" is not considered a problem in military applications because it is not military practice to repair damaged tubeless tires by inserting inner tubes in the same, but rather to proceed with 100% replacement of damaged tubeless tires with new, undamaged tubeless tires. Moreover, in military applications in which the take apart wheel is equipped with a run-flat insert 90 or the like, the tire/wheel assembly can be run deflated until the tire is replaced.

Thus, although the aforementioned safety wheel and run-flat wheel constructions have been successfully built and tested for use on military vehicles, certain problems nevertheless remain, such as the aforementioned lack of safe convertibility of a military specified design to non-military heavy duty truck use for the commercial on-highway and off-highway markets, as well as the continuing need to improve the rim-to-brake clearance for a given wheel size, the desirability of employing a standardized disc for various rim parts having thicknesses differing from the disc, and vice versa, while retaining the ability to accommodate a variety of wheel offsets from a standard set of component parts. Moreover, it is desirable from the manufacturing cost standpoint that the above parameters be satisfied in a wheel construction which can be made on existing conventional stamping equipment with respect to the disc, and wherein the rim parts can be made on conventional roll forming or die stamping equipment so that spin forming equipment operations need not be utilized in the manufacture of the wheel, and so that the two-part wheel subassembly can be made on conventional and existing rim-disc press fit and welding equipment.

Another type of take-apart wheel construction employs a one-piece wheel disc integral with an outboard tire bead seat portion and outboard tire bead retaining flange, which is removably secured by bolts to an inboard rim part comprising a inboard tire bead retaining flange, rim bottom portion, usually of cylindrical configuration, and a radially in-turned mounting flange. Examples of this type of take-apart wheel construction may be found in the following United States Patents:

| Mitchell | 3,865,170 |
| Mitchell | 3,885,615 |
| Sano | 4,106,543 |
| Osada et al | 4,216,810 |
| Okada | 4,228,840 |
| Osada et al | 4,372,365 |

However, none of such prior art proposals would appear to provide a safety tire and take-apart wheel construction which would fulfill all of the stated objects of the present invention nor provide the features and advantages of the same.

Accordingly an object of the present invention is to provide an improved take-apart wheel rim assembly utilizing a tubeless pneumatic tire, and having a safety vent feature, which overcomes the aforementioned problems present in such wheel constructions, optimizes the aforementioned desirable product design and manufacturing parameters and which is safely usable in either military or commercial applications.

Another object of the present invention is to provide an improved take-apart wheel rim assembly of the aforementioned character having an improved anti-inner tube safety feature provided by an improved inflation valve coupling structure having an anti-inner tube valve safety passageway permanently incorporated into the aforementioned wheel rim assembly, and an improved method of making the same.

BRIEF DESCRIPTION OF THE DRAWINGS

The invention, together with additional objects, features and advantages thereof, will be best understood from the following detailed description, the appended claims and the accompanying scaled drawings (FIGS. 1-8 and 10-18 being scaled from engineering drawings), in which:

DETAILED DESCRIPTION OF PREFERRED EMBODIMENTS

In the following description and claims, directional adjectives such as "inboard" and "outboard" are taken with reference to a preferred orientation of mounting of the wheel, etc., on a vehicle, and no undue limitations should be inferred therefrom where such directional adjectives are not essential to operation of the structural and functional features of the invention.

Figure 1:
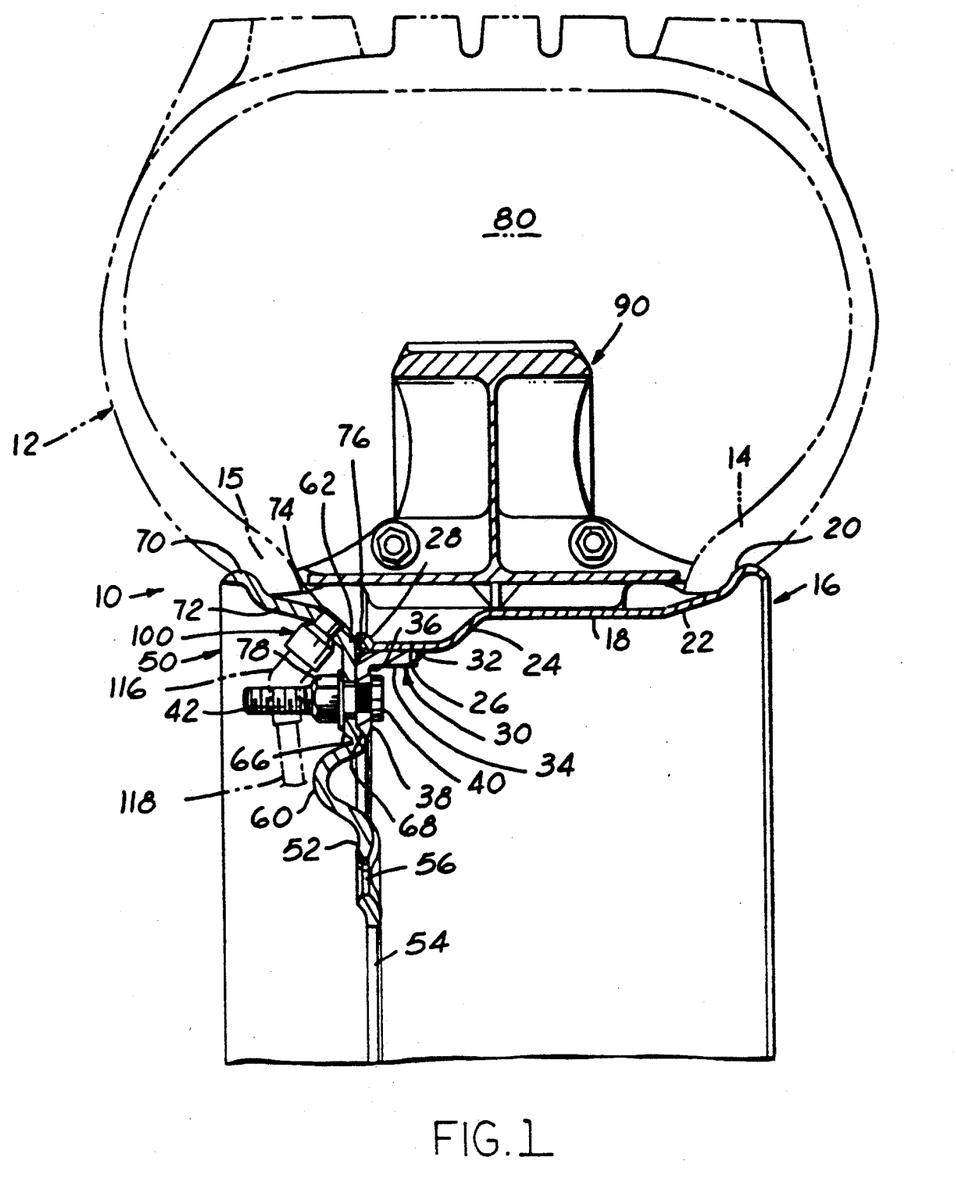
FIG. 1 is a fragmentary sectional view, taken on the line 1—1 of FIG. 2, of an exemplary embodiment of the wheel assembly of the present invention, the parts being illustrated in fully assembled relationship with a run-flat insert and a tubeless pneumatic tire (shown in phantom) mounted on the wheel assembly.
Figure 2:
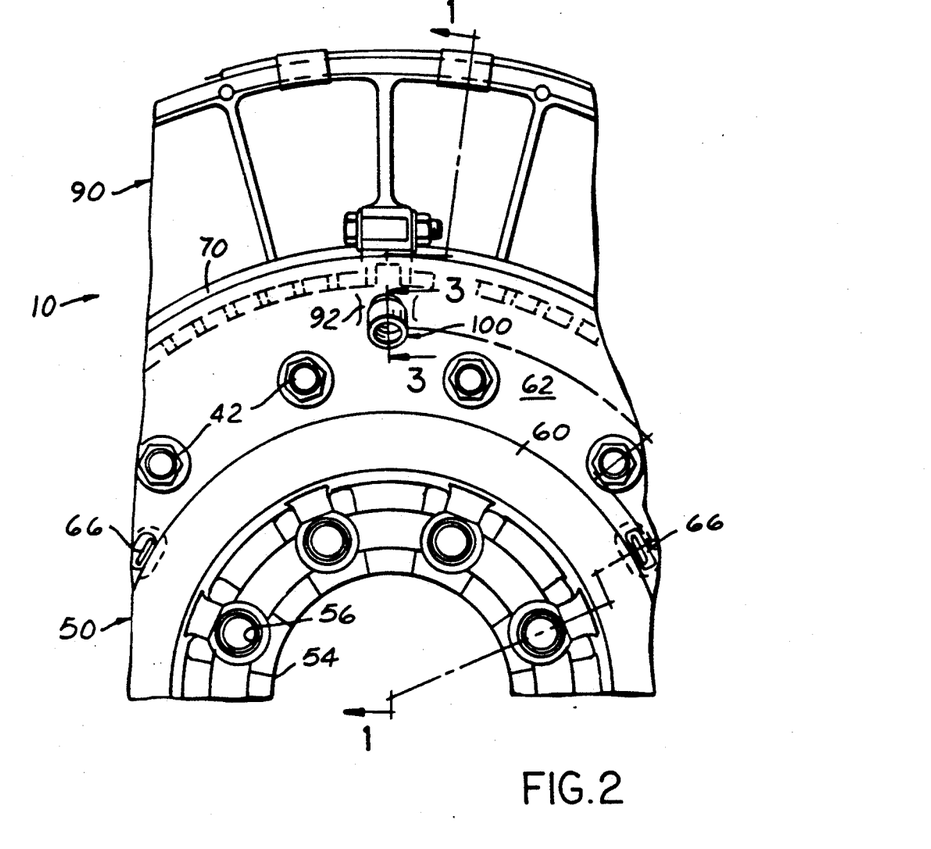
FIG. 2 is a fragmentary side elevational view of the wheel assembly of FIG. 1 without a showing of a tire thereon.
Figure 3:
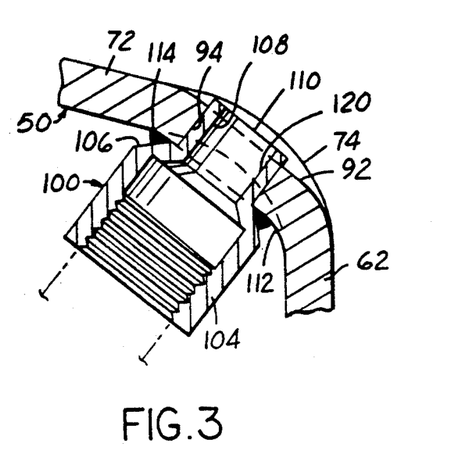
FIG. 3 is a fragmentary enlarged cross-sectional view taken on the line 3—3 of FIG. 2, of one embodiment of a tire inflation valve safety mounting structure of the invention.

FIGS. 1-3 illustrate a presently preferred embodiment of a take-apart safety tire and wheel assembly in accordance with the present invention as comprising a wheel assembly 10 and a tubeless pneumatic tire 12 (shown in phantom in FIG. 1) mounted by its inboard and outboard tire beads 14 and 15 on wheel 10. Wheel assembly 10 includes an inner rim part 16 having a cylindrical rim base 18 and an inboard bead retaining flange 20 integrally projecting radially outwardly therefrom and coupled thereto by a 15° bead seat 22. An outboard portion of inner rim part 16 is rolled form to provide a relatively small drop well comprising an inclined frusto conical shoulder 24 extending from base 18 radially inwardly to a reduced diameter cylindrical portion 26. The outboard free edge of rim part 16 comprises a lip portion 28 which is curled radially outwardly from portion 26 so as to present a slightly concave surface on its radially inner side.

A mounting ring 30, which is generally L-shaped in radial cross section, is permanently affixed to inner rim part 16 by a circumferential weld 32 at the junction of an inboard edge of a cylindrical flange 34 of ring 30 with the inner periphery of rim well portion 26. Flange 34 is designed to telescope with a press fit against the inside of rim well portion 26. Ring 30 has a relatively large radius corner portion 36 joining flange 34 to a radially inwardly extending flange 38. Flange 38 is convexly contoured toward the inboard side of the wheel and has a row of stud holes which individually receive a series of mounting bolts 40 arranged with their heads inboard. Each bolt 40 has a spline section press fit into the associated bolt hole and also has threaded shank 42 which protrudes axially outboard of ring 30 a predetermined distance.

Wheel assembly 10 further includes an outer rim and disc part 50 comprising a disc bolt circle portion 52 with a center pilot opening 54 formed therein and a circular row of bolt holes 56, wheel mounting studs (not shown) being individually insertable through holes 56 for mounting wheel assembly 10 on a vehicle in the usual manner. The portion of part 50 radially outwardly of bolt circle portion 52 has an annular hat section 60 which blends into a radially extending circular portion 62. A circular row of stud openings are formed in disc portion 62 for individually receiving wheel assembly studs 40 therethrough. A series of three equally angularly spaced, axially inboard struck, locating projections 66 are formed at the junction of hat section 60 with portion 62 (FIGS. 1 and 2), and the inclined inner edge 68 of flange 38 is adapted to seat upon projections 66 for locating inboard and outboard parts 16 and 50 relative to one another during assembly.

Outboard disc/rim part 50 has an outboard rim portion comprising a outboard tire bead retaining flange 70, an outboard tire bead seat portion 72 (also inclined at 15° relative to the wheel axis) and a curved portion 74 merging integrally with portion 62 of the disc.

An O-ring seal 76 is received in the generally triangular cavity defined (in radial cross section) between lip 28, curved shoulder 36 and disc circular portion 62. Seal 76 is axially squeezed between the three circumferentially continuous annular sealing surfaces defining this cavity when nuts 78, threadably received on shanks 42, are tightened against the outboard face of circular disc portion 62, thereby sealing the interior air cavity 80 of tire 12 against leakage through the wheel assembly 10. O-ring 74 is dimensioned such that in its free state it is readily inserted into the open annular groove defined between rim lip 28 and flange shoulder 36 prior to assembly of outer disc-rim part 50 onto part 16. Tightening nuts 78 forces disc portion 62 into fully assembled condition and thereby compresses O-ring 74 further into the aforementioned triangular cavity.

It will now be readily understood from the foregoing that O-ring 76, when inserted into the open annular groove defined between rim lip 28 and flange shoulder 36, and prior to assembly of outer disc-rim part 50 onto part 16, protrudes axially a short distance in an outboard direction from the radial plane defined by the outboardmost surfaces of lip 28 and flange 38.

Hence when the radially extending planar inboard surface of disc portion 62 (which forms the third sealing surface defining the aforementioned triangular cavity) is brought into flatwise and sealable engagement with O-ring 76, the amount of squeezure of the O-ring, developed during compression thereof by tightening of nuts 78 to force disc portion 62 axially of the wheel into fully assembled condition, may vary slightly without thereby impairing the air-sealing capability of O-ring 76 in the triangular sealing cavity. This deformable protrusion of O-ring 76 thus can advantageously accommodate a small range of dimensional variations and manufacturing tolerance stack-ups which may be customarily encountered in the tire bead toes 14 and 15, the rim base part 16 and disc-rim part 50, as well as in the run-flat safety insert 90 or other bead lock insert constructions (in a direction axially of the wheel) if employed in the tire and wheel assembly of the invention.

As set forth in the aforementioned Strader U.S. Pat. No. 4,481,997 and in the Weeks et al U.S. Pat. No. 4,836,261, wheel assembly 10 is provided with a safety vent feature for exhausting air from tire cavity 80 radially inwardly of the wheel assembly in the event wheel disassembly is attempted in a non-fully deflated condition of tire 12. In the disclosed embodiment of FIGS. 1 and 2, if tire 12 remains fully or partially inflated, as the assembly nuts 78 are removed the outboard rim disc part 50 will flex axially outwardly, as well as axially bodily separate, from inboard part 16, allowing O-ring 76 to be forced by the air pressure over the outer periphery of the shoulder 36. Simultaneously, the compression stress on the O-ring is relieved by movement of disc portion 62 axially outboard (to the left as viewed in FIG. 1) as the nuts are being loosened. At a given stage of separation during this nut loosening process, the air will exhaust quickly from the interior of the tire. The length of bolt shanks 42 is sufficient to insure nut retention thereon during the loosening process, thereby enabling sufficient separation of part 50 from part 16 to insure complete depressurization of tire cavity 80 while sufficient threads extend outboard of nuts 78 to continue holding part 50 to parts 16/30.

Wheel assembly 10 is adapted to receive a run-flat safety insert 90 carried by wheel assembly 10 internally of tire 12 for supporting the latter in the event of tire deflation. Insert 90 is constructed similar to safety insert 16 of the aforementioned Strader '791 patent, or insert 14 of the aforementioned Strader '997 patent, and also performs a bead lock function in assembly with tire 12 and wheel 10. Alternatively, the safety insert may be constructed in accordance with the aforementioned Payne et al '854 patent. In any event, the safety insert 90 is shown herein merely by way of background and does not form part of the present invention. As indicated previously, such a safety insert has hitherto been provided to enable run-flat operation for military applications of wheel 10.

In order to meet military specifications with the aforementioned HMMWV military vehicle a relatively large diameter air inflation opening must be provided to communicate a source of compressed air located exteriorly of the wheel assembly via inflation valve structure with the interior tire cavity 80 for tire inflation purposes and for venting of the tire cavity for tire deflation. Accordingly, an outboard projecting flat portion 92 is die struck in the curved portion 74 of part 50, as best seen in FIGS. 2 and 3. A cylindrical opening 94 is drilled or punched through this portion so as to have a nominal inside diameter of 0.450 inches in order to accommodate the military specified standard air inflation valve structure (not shown although it may be such as that shown in FIG. 9 as described hereinafter) fixedly mounted with its stem inserted in opening 94.

Wheel assembly 10 as thus far described is well suited to meet the requirements of military take-apart wheels for high mobility military vehicles in accordance with several objects of the invention. Among the features of wheel 10 as thus far described are the provision of the outboard combined disc and rim part 50 which, as configured and constructed as previously described and shown in the drawings, is particularly well adapted for manufacture by an efficient stamping process from sheet or plate steel in conventional, already-existing stamping equipment. Likewise, mounting ring 30 is readily made as a sheet metal stamping. The three pilots 66 are likewise readily die struck in part 50 to precise dimension. The inboard rim part 16 may be made of thinner section sheet metal and roll formed in standard wheel rim forming equipment. This part may also be made with different axial lengths to accommodate different axial off-sets while parts 30 and 50 are kept standardized.

Due to the location of the air inflation opening 94 in the outboard part 50, exteriorly mounted tire inflation valve structure, instead of interiorly mounted tire inflation structure (such as the turret valves 24 of the aforementioned Weeks et al patent '261), may be utilized. Hence, greater clearance is provided interiorly of inboard rim part 16 for associated wheel brake structure. Moreover, the take-apart wheel safety venting structure of the aforementioned Strader '997 patent and/or Weeks et al '261 patent is retained. If desired, the air venting grooves, knurled indentations and/or drilled passages of these patents may be provided in mounting ring 30 to operate in the manner of the aforementioned patents.

The generally V-shaped circular cavity defined by rim lip 28 and shoulder 36 of ring 30 provides a convenient outboard facing trench in which to loosely insert O-ring 76 by hand, a slight press-in finger force being sufficient to temporarily retain O-ring 76 in this cavity if the wheel is being assembled with its axis horizontal. If assembly of wheel 10, insert 90 and tire 12, is performed with the inboard edge of part 16 resting on a horizontal surface, and with the O-ring receiving groove facing upwardly (wheel axis vertically oriented), the O-ring 76 may be merely dropped into proper location, ready for assembly of part 50 against ring 30. Since wheel assembly 10 constitutes a three-piece assembly (parts 16, 30 and 50) as contrasted with the four part assembly of the aforementioned Weeks et al '261 patent (parts 16, 40, 80 and 100 therein), it is less costly to manufacture and assemble.

In accordance with another feature of the present invention, wheel 10 is provided with special tire inflation valve mounting structure which meets the military specifications indicated previously, and which also renders wheel assembly 10 anti-inner tube safe for use in commercial heavy duty truck on-highway and off-highway vehicle applications. As best seen in FIGS. 1, 2 and 3, a special fitting 100 provided in accordance with the present invention which, in the first embodiment of FIG. 3, is a conventional tapered pipe thread connector properly sized for this particular application. Connector 100 has a cylindrical body portion 104, a frusto conical tapering neck portion 106 and a cylindrical sleeve portion 108. The outside diameter of sleeve 108 is dimensioned for a close sliding fit in disc hole 94. The axial dimension of sleeve 108 is selected such that the inner end 110 of sleeve 108 protrudes inwardly of disc 50 slightly beyond the inboard surface of flat 92 but not beyond the radius of shoulder 74 when the shoulder of neck 106 abuts the outer surface 112 of flat 92. A continuous circumferential MIG weld 114 is employed to permanently affix connector 100 to disc 50 and to seal against air leakage. The interior of connector body 104 is suitably threaded and otherwise adapted for coupling to a conventional tubing connector 116 (indicated in phantom in FIG. 1), which in turn is coupled to a tubular compressed air supply line 118 (FIG. 1) communicating with the on-board central tire inflation system (CTIS) of the military vehicle.

It is to be particularly noted that the cylindrical inner periphery 120 of connector sleeve 108 has an inside diameter in the order of 0.250 inches to provide, on the one hand, a relatively unrestricted passage for admitting compressed air for inflating tire 12, and for exhausting compressed air from tire cavity 80 for deflating tire 12, but on the other hand, small enough to preclude passage therethrough of even the smallest-size tire inflation valve customarily provided on an inner tube of sufficient size for use in tire 12 (see wheel and tire specifications hereinafter). Such inner tube valves have been found to have a minimum outside diameter of at least 0.305 inches with respect to inner tubes sizes for the embodiment of the wheel assembly and tire illustrated in FIGS. 1 through 3. Hence, the safety fitting 100 of the present invention effectively prevents the installation of an inner tube in tubeless tire 12. However, as indicated previously, in the absence of safety connector 100, such a 0.305 inch diameter inner tube valve stem can be inserted through the disc hole 94, which could thus permit improper installation and use of an inner tube in tire 12 and thereby create an unsafe condition in a take-apart wheel.

Figure 4:
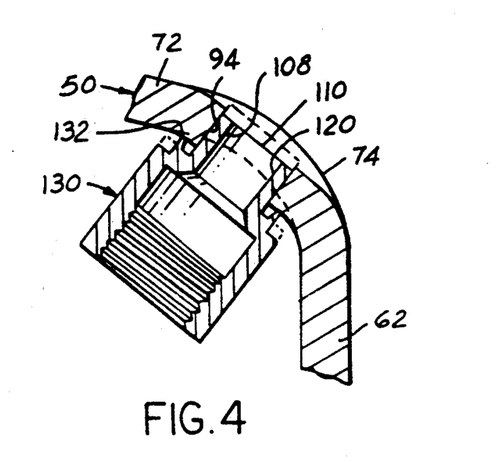
FIG. 4 is a fragmentary enlarged cross sectional view of another embodiment of a tire inflation valve safety mounting structure of the invention.

Referring to the alternative second embodiment of FIG. 4, a modified safety connector 130 is illustrated which is similar to connector 100 with respect to the neck sleeve 108 and its exterior and safety interior dimensional relationship as described in conjunction with connector 100. However, connector 130 is designed with a circular weld projection 132 in its shoulder area to adapt connector 130 to be projection welded to disc 50. The interior of connector 130 may be adapted as desired for connection to standard inflation valves and thus, for example, may have a ¼ inch National Pipe Thread (NPT) for this purpose.

From the foregoing description of the first and second embodiments of safety (anti-inner tube) inflation valve coupling structure, as well as from the description hereinafter of the third and fourth embodiments of such coupling structure, it will now be understood that take-apart wheel assembly 10 of the present invention provides not only the several advantages previously mentioned, but also a safety take-apart wheel construction of universal application, i.e., one which can be safety utilized on commercial heavy duty on-highway and off-highway vehicles as well on-military vehicles. By thus greatly expanding the potential market for take-apart wheels hitherto made only for the military market, significant cost reductions can be obtained because of higher volume mass production. Such cost reductions, by at least partially off-setting the added cost of a run-flat insert 90 or the like, in turn makes it more economically feasible to employ run-flat take-apart wheel assemblies in commercial applications which in turn offers substantial savings in operation and greatly improved safety in the commercial field.

By way of example rather than by way of limitation, one successful embodiment of an improved safety take-apart wheel construction 10 constructed in accordance with the present disclosure employed the following specifications and parameters:

| Tire 12 | 36 × 12.5-16.5 bias tire |
| --- | --- |
| Bead seat diameter of wheel 10 | 16.5 inches |
| Bead seat width with wheel 10 | 08.25 inches |
| Axial offset of inner mounting plane of disc portion 52 relative to wheel center line | 2.125 inches |
| Bolt hole circle diameter | 6.5 inches |
| Number of flanged hex nuts 78 | 12 |
| Torque tension applied to nuts 78 before tire inflation | 125 ft.-lb. |
| Average finished stock thickness of outboard part 50 | 0.230 inches |
| Average finished stock thickness of mounting ring 30 | 0.205 inches |
| Average stock thickness of inner rim part 16 | 0.135 inches |
| Material of parts 16, 30 and 50 | steel |

FIGS. 5-8 illustrate a third embodiment of a safety tire inflation valve coupling or connector structure, a preform part for, and method of constructing, the valve connector, wherein like reference numerals are utilized to designate the structure of the outboard rim and disc part 50 described previously herein. In this third embodiment, a special fitting 150 (FIG. 5) is provided, which like the valve couplers or connectors 100 and 130 described previously, meets the military specifications indicated previously, and which also renders wheel assembly 10 safe for use in commercial heavy duty truck on-highway and off-highway vehicle applications.

In accordance with another feature of the present invention, fitting 150 is constructed and attached to the outboard rim-disc part 50 in accordance with an improved method of the present invention. In this method, the outboard rim and disc part 50 is constructed as described previously so as to have the outboard projecting flat portion 92 die struck in the curved portion 74 of part 50, and to provide the flat outer surface 112 of flat 92. However, the cylindrical opening 94 shown in FIGS. 3 and 4 is omitted in the construction of the third embodiment for reasons which will become apparent hereinafter.

Figure 6:
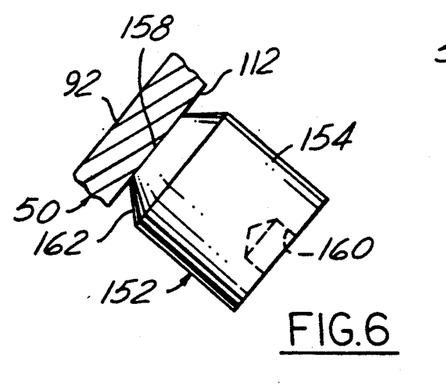
FIG. 6 is a fragmentary part elevational, part sectional view illustrating a preform utilized in the construction of the valve mounting structure of the embodiment of FIG. 5, and one step in the method of constructing the same.
Figure 7:
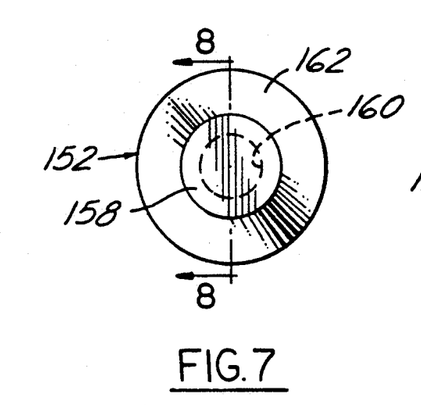
FIG. 7 is a top plan view of the preform of FIG. 6.
Figure 8:
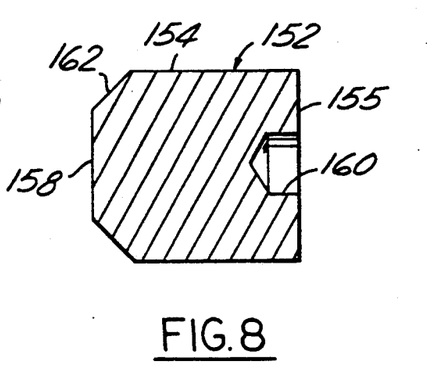
FIG. 8 is a cross-sectional view taken on the line 8—8 of FIG. 7.

In the next step of the method of constructing coupling structure 150, a special preform 152 is constructed as shown in FIGS. 6, 7 and 8. Preform 152 comprises a solid cylindrical metal body having a cylindrical side surface 154 and flat end faces 156 and 158 cut perpendicularly to the axis of the body. End faces 156, 158 may be formed in cutting to length suitable rod or bar stock of cold rolled steel such as SAE 1010-1020. A blind pilot hole 160 is drilled coaxially into the center of outboard face 156. The inboard end of preform 152 is provided with a large chamfer 162 at a bevel angle of 45° to the axis of preform 152 so that the diameter of the outboard end face 158 is made small enough for preform 152 to be seated against the outboard face 112 of flat 92 in flat face abutment therewith as shown in FIG. 6 such that the outboard curved surfaces 164 and 166 of portions 62 and 72 of part 50 leading into flat surface 112 do not interfere with this flat full face seating.

In the next step of the method, preform 152 is placed on the outboard tip (not shown) of a resistance welding electrode of a commercial resistance welding machine which in turn is fixtured to suitably receive and hold rim-disc part 50 in proper position for welding of preform 152 thereto. The inboard tip (not shown) of the opposed welder electrodes seats flat against the surface of flat 92 opposite the outboard tip, the center line of the electrode tips and preform 152 being aligned with the center of flat 92.

The welding machine is then cycled to force preform 152 against surface 112 and welding current is applied through and between the tips to thereby resistance weld preform 152 to part 50 while urging the parts together under constant pressure. The welding heat and pressure causes the beveled nose of preform 152 to melt and mushroom against surface 112 as a resistance weld joint 170 (FIG. 5) is formed by the metal of part 50 and preform 152.

Figure 5:
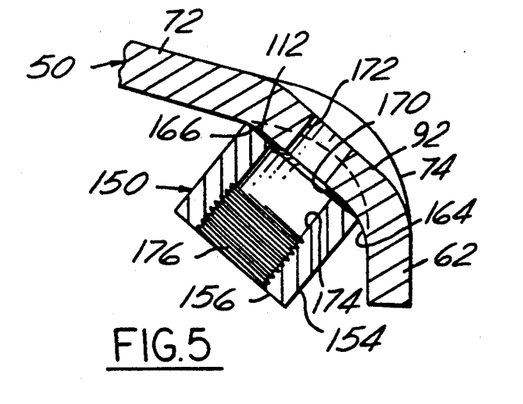
FIG. 5 is a fragmentary enlarged cross-sectional view of a third embodiment of a tire inflation valve safety mounting structure of the invention, the cross sectioning line being the same as that utilized in FIG. 3.

Part 50, with preform 152 welded thereto, is then de-fixtured from the welding machine and fixtured in a suitable drilling machine. Preform 152 is first center drilled, the drill bit engaging preform 152 from the outboard end first, so that the drill point first enters pilot hole 160 and then proceeds to drill coaxially through insert 152 and then through flat 92 of part 50 to form a uniform diameter passage through both pieces, thereby forming the cylindrical air passage 172 in flat 92 (FIG. 5).

Then preform 152 is drilled and reamed to form the larger diameter counterbore 174 coaxially with bore 172, bore 174 terminating at its inner end at the weld joint 170. Pipe threads 160 are then formed by tapping and bottom tapping counterbore 174 to adapt the same for threadably receiving the military specified standard air inflation valve structure (not shown).

The air inflation valve connector or coupler 150 as thus formed in one successful working embodiment was made to the following specifications:

| | |
|---|---|
| Axial length of preform 152 | 0.83 inches |
| Diameter of surface 154 preform 152 | 0.75 inches |
| Diameter of pilot hole 160 | 0.250 inches |
| Diameter of end face 158 | 0.400 inches |
| Thread 176 | ¼-18 NPTF |
| Commercial welding machine employed | Sciaky Model #DMC03T-250-24 |
| Air pressure setting on welding tip | 3000 psi |
| Current setting on welding machine | 125 kVA/ 12 impulses |

The third embodiment inflation valve coupler or connector 150 constructed as described above and illustrated in FIGS. 5-8 provides the same diameter air passage 172 as the passage 108 of the previous embodiments 100 and 130. Hence a relatively unrestricted passage for admitting compressed air for inflating the tire 12, and for exhausting compressed air from tire cavity 80 for deflating tire 12, is also provided in this embodiment. Likewise, passage 172 is small enough in diameter to preclude passage therethrough of even the smallest-size tire inflation valve customarily provided on an inner tube of sufficient size for use in tire 12. Hence safety fitting 150 also effectively prevents installation of an inner tube in tubeless tire 12. A take-apart wheel assembly 10 provided with connector 150 therefore can be safety utilized on commercial heavy duty on-highway and off-highway vehicles as well as on military vehicles.

In addition, it has been found that inflation valve connector 150 represents an improvement over the previously described connectors 100 and 130 in providing a very secure permanent attachment to the outboard disc and rim part 50. Weld 170 has been found to be considerably stronger than the welds formed in conjunction with connectors 100 and 130. Indeed, connector 150 cannot be removed from part 50 without thereby producing a noticable modification or alteration to part 50, e.g., the weld 170 pulls parent metal of part 50 upon application of sufficient force to remove connector 150 from part 50. Connector 150 also does not require any add-on manufacturing operations in making disc part 50 in order to accommodate connector 150. Instead, elimination of the operation of forming the hole 94 helps offset the cost of drilling the initial through-passage 172 in parts 50 and 150.

A wheel 10 provided with connector 150 as described hereinabove was tested on a bull wheel for radial fatigue according to SAE requirements. This testing demonstrated a substantial excess in cycles to failure over that required to meet SAE J267 recommended practice. It is believed that these improved results have been obtained as a result of welding the solid slug preform 152 to the unperforated metal of the disc flat 92 prior to providing the air passage 172 and counterbore 174 with the threads 176. By so constructing connector 150 in-situ, with imperforate disc flat 92 in part 50 and preform 152 being solid rather than a shell, these parts are better able to withstand the welding pressure and welding heat. Deformation or distortion of threads 176 is avoided because these are formed after completion of the welding operation. In addition, the resistance weld 170 is initially formed over a wide surface area between face 158 and surface 112 so that a strong resistance weld can be formed with minimal adverse metalurgical effects from the weld heat generated in the metal of rim-disc part 50 and connector 150. The frusto conical shape of surface 162, in addition to removing interference with the disc surfaces 164 and 166, provides sacrificial weld metal which enables the junction of cylindrical surface 154 with surface 162 to be brought up adjacent surface 112 during the resistance welding cycle as parts 152 and 50 are forced together by the welding machine. For the foregoing reasons, inflation valve connector 150 is preferred over the previously described embodiments 100 and 130.

Although the first, second and third embodiments 100, 130 and 150 respectively of the inflation safety valve coupling structure of the invention have been successfully made and tested from the standpoint of achieving a permanent anti-inner tube valve safety or control inflation passageway for the military take-apart wheel construction so as to render the same adaptable for commercial use, they do lack the advantage of removability of the prior art inflation valve coupling structure such as that shown in FIG. 9. Referring in more detail to FIG. 9, this prior art tire inflation coupling, indicated generally at 200 in FIG. 9 consists of a brass body 202 formed externally at one end with a hexagonal nut head 204 which merges into a cylindrical portion 206 which in turn terminates at a reduced diameter, externally threaded cylindrical shank portion 208. Shank 208 has an external diametrical dimension sized to fit closely through the large diameter (0.450" nominal) hole 210 in the rim 212 of the associated military vehicle wheel. Shank 208, once inserted through hole 210 as shown in FIG. 9, is removably secured to rim 212 by a pair of lock nuts 214 and 216 which are tightened against a Belleville washer 218 to force the same against the tire side surface of rim 212 to lock coupling 202 removably onto rim 212. An elbow coupler 220 is screwed into the internally threaded portion of body 202, and a tubing line 222 is connected thereto by a compression flare nut 224, line 222 being coupled to the CTIS equipment of the vehicle. An elastomeric seal 226 is received on threaded shank 208 and compressed by shoulder portion 206 against the weather side of rim 212 upon tightening of nuts 214 and 216 to thereby prevent air leakage from the tire cavity via hole 210.

This prior art coupler 202, because of its removability by unthreading nuts 214 and 216 and slidably removing washer 218, may be readily replaced if seal 226 is damaged either in use or by aging, a replacement operation typically performed upon each changing of a worn or damaged tire, if not sooner. Moreover, if coupler 202 itself was damaged, such as by damage to the threads on shank 208 or the internal threads in head 204, or by being bent from striking rocks or the like, it also could readily be replaced with a new coupler 202. Also, the wheel to be used on the vehicle could be made and shipped without the coupler attached and this later installed by the customer or an assembly facility or in the field by use of simple hand tools. Despite these advantages of the prior art coupler 202 relative to the first, second and third embodiments 100, 130 and 150 of the anti-inner tube safety coupler of the invention described previously hereinabove, the prior art coupler 202 could not be used to convert the military take-apart wheel to commercial use because it could be readily removed, leaving the large diameter rim hole 210 exposed. Once the rim was put in this unsafe condition, the aforementioned field fix could be performed by installing an inner tube within the damaged tire and inserting the inner tube valve through hole 210, thereby rendering a take-apart wheel unsafe for the reasons described previously.

In accordance with a further feature of the present invention, a fourth embodiment of a safety inflation valve coupling structure is shown in FIGS. 10-18 which obtains the advantages of ready removability of the prior art military wheel inflation coupler 202, but which also renders the military take-apart wheel construction safe for commercial use by preventing installation of an inner tube in a tubeless tire. Referring in more detail to FIGS. 10-19, this fourth embodiment tire air inflation structure includes an insert assembly, generally indicated at 300 in these Figures, and a modified take-apart safety tire and wheel assembly 10' which is identical to wheel assembly 10 except for the structure of the coupling passageway provided in the disc part 50' of assembly 10'. Accordingly, those portions of wheel assembly 10' identical to assembly 10 are given identical reference numerals and their description not repeated. Wheel assembly 10' is adapted to receive the pneumatic tubeless tire 12 indicated in phantom in FIG. 10, and may also be equipped with the run-flat safety insert 90 (not shown) or other bead lock insert constructions as described previously.

The only essential difference between wheel 10' and wheel 10 is that disc 50' does not have the large circular opening 94 in the die struck flat 92 (FIG. 3), but instead is provided with a non-cylindrical, and preferably generally eliptical, through passageway or opening 302 (FIGS. 12, 13 and 14) die struck from flat 92 with its axis perpendicular to the surface of flat 92. Opening 302 is preferably formed to have parallel spaced straight surfaces 304 and 306 and rounded opposite end corner surfaces 308 and 310 (FIG. 12) so as to have a safety cross-sectional configuration in the shape of an oval, i.e., a rectangle having rounded corners. The dimension A shown in FIG. 14, which is the distance taken perpendicularly between the straight surfaces 304 and 306 of opening 302, is a predetermined safety control dimension preferably slightly less than the smallest outside diameter dimension formed on the free or nipple end of the customary cylindrical inner tube inflation valve body provided on an inner tube properly sized to fit whatever size tire 12 is rated for a specified size of wheel 10', as explained in more detail hereinafter.

Referring to FIGS. 15-18, insert assembly 300 comprises a body member 400 which may comprise a screw machine-made part machined from hexagonal stock material, preferably steel, so as to provide a hexagonal nut portion 312 having an exterior end face 314 and an oppositely disposed shoulder face 316. Body 400 is also formed with a reduced diameter shank portion 318 which protrudes coaxially of nut portion 312 to provide a tire-interior end face 320. Shank portion 318 is formed with a pair of parallel flat side faces 322 and 324 spaced apart by a distance A' (FIG. 15) correlated with dimension A of disc opening 302. The opposite end surfaces of shank 318 bounding sides 322, 324 are curved and formed on a common diameter about the axis of body member 400 and provided with external threads 326 and 328. Preferably shank 318 is first formed by lathe turning a reduced diameter cylindrical protrusion from nut portion 312, and then a common external thread is die-turned on the cylindrical periphery of this preform.

Figure 15:
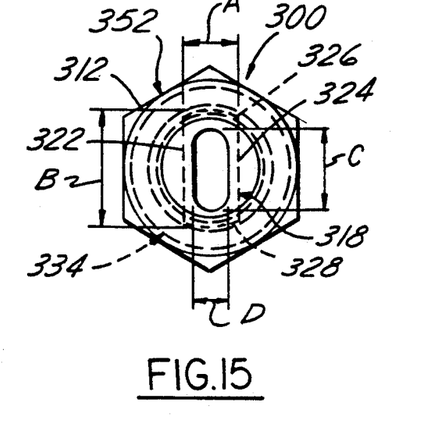
FIG. 15 is an end elevational view of the fourth embodiment of the tire inflation valve coupling insert assembly of the invention.
Figure 16:
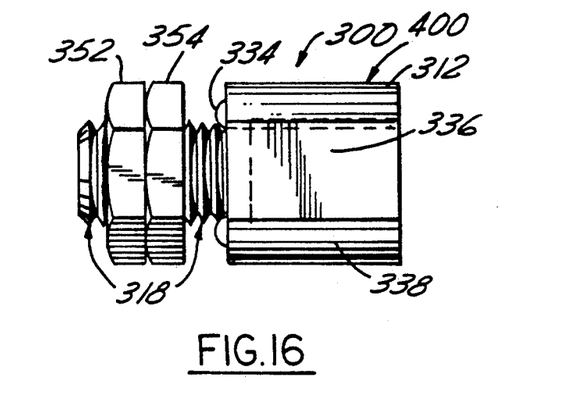
FIG. 16 is a side elevational view of the coupling insert assembly shown in FIG. 15.

Then preform is milled to form the flat surfaces 322 and 324 so as to convert the common external threads into interrupted companion threads 326 and 328. Threads 326 and 328 terminate short of end face 316 of body portion 312 to leave a unthreaded portion 330 on shank 318. A hemispherical groove 332 is machined in the end face 316 so as to encircle shank portion 330 and have its inside diametrical dimension contiguous therewith to form a pocket for receiving an O-ring 334 (FIGS. 15 and 16). Nut portion 312 of body 400 has a cylindrical bore 336 provided with internal threads 338 adapted to receive a standard inflation valve or coupling fitting such as the tank valve 340 shown in phantom in FIGS. 10 and 11.

Figure 10:
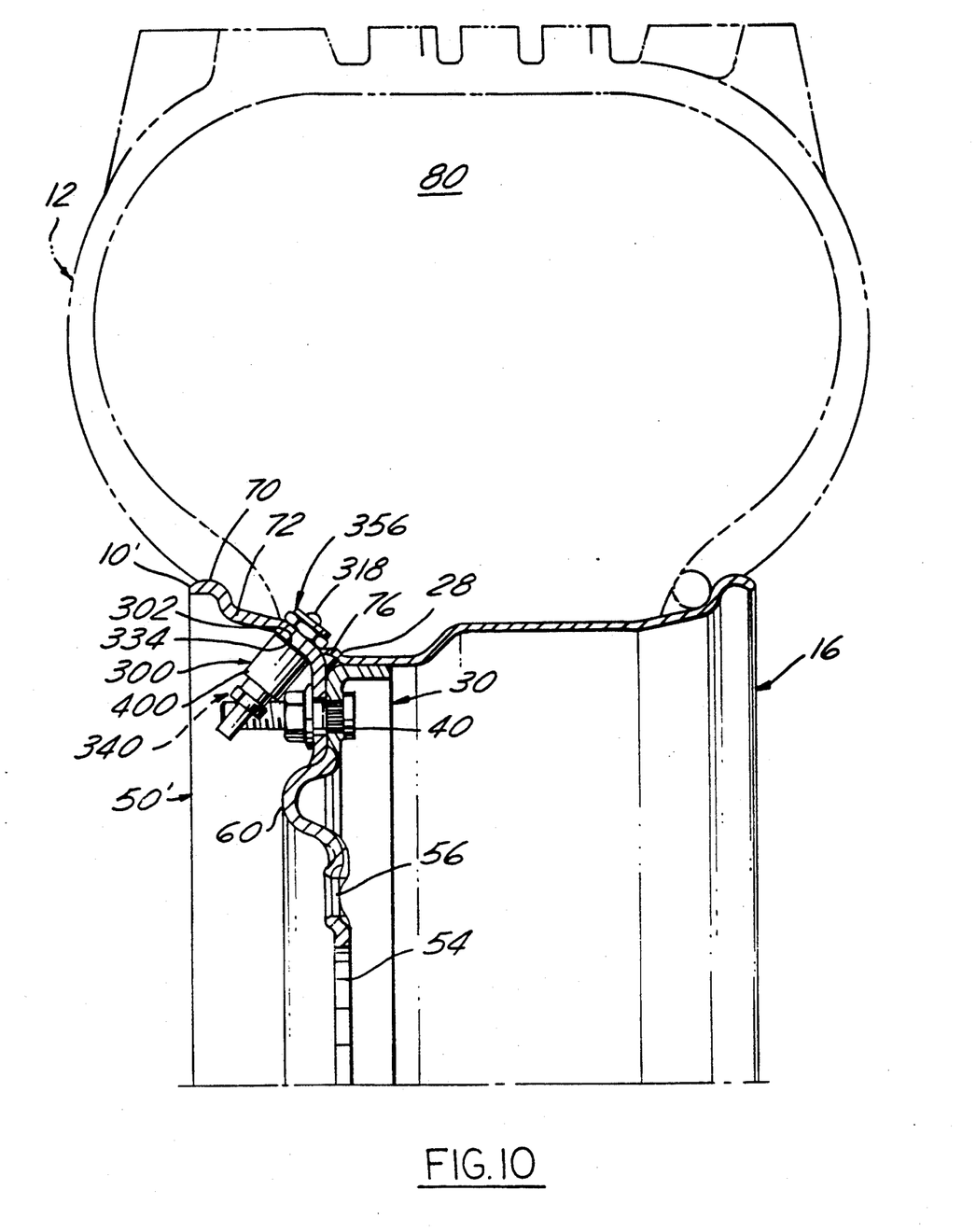
FIG. 10 is a fragmentary sectional view, taken on the line 10—10 of FIG. 11, of a presently preferred fourth embodiment of the wheel assembly of the present invention, the parts being illustrated in fully assembled relationship with a tubeless pneumatic tire (shown in phantom) mounted on the wheel assembly, but with the run-flat insert of FIG. 1 omitted (although usable therewith).
Figure 17:
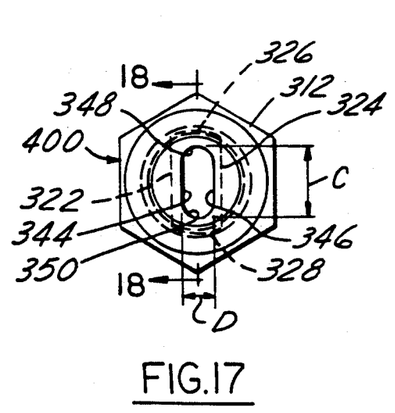
FIG. 17 is an end elevational view of the insert body of the insert assembly of FIG. 15 and 16 without the two lock nuts and O-ring being mounted thereon.
Figure 18:
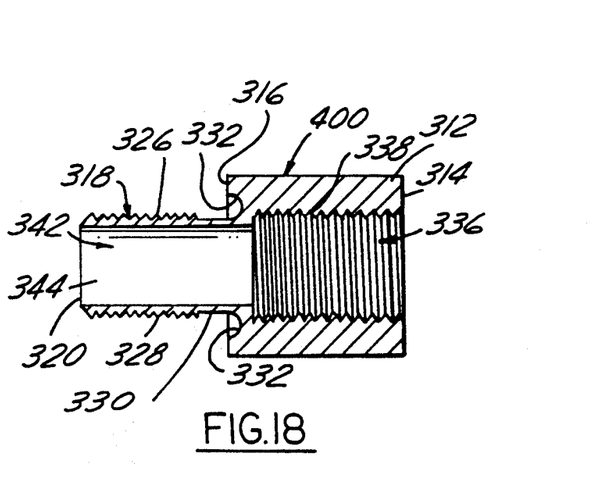
FIG. 18 is a cross-sectional view taken on the line 18—18 of FIG. 17.

Shank portion 318 is formed with a counterbore 342 having an oval shape in cross section as defined by a pair of flat parallel interior side surfaces 344 and 346 bounded by opposed rounded corner surfaces 348 and 350 (FIGS. 15 and 17). The distance between surfaces 344 and 346 is indicated by the dimension D and the distance between the apices of surfaces 348 and 350 is indicated by dimension C in FIGS. 15 and 17. Counterbore 342 is coaxial with threaded bore 336 and together they form a through passageway in body member 400 which serves in this fourth embodiment as the interior air inflation (and deflation) flow passage for tire cavity 80. Insert assembly 300 is completed by a pair of hexagonal lock nuts 352 and 354 which, as shown in FIGS. 15 and 16, are threadably received on the interrupted thread 326-328 of shank 318. Alternatively, a suitable single conventional self-locking nut 356 may be substituted for nuts 352 and 354 as shown in FIG. 10.

Figure 19:
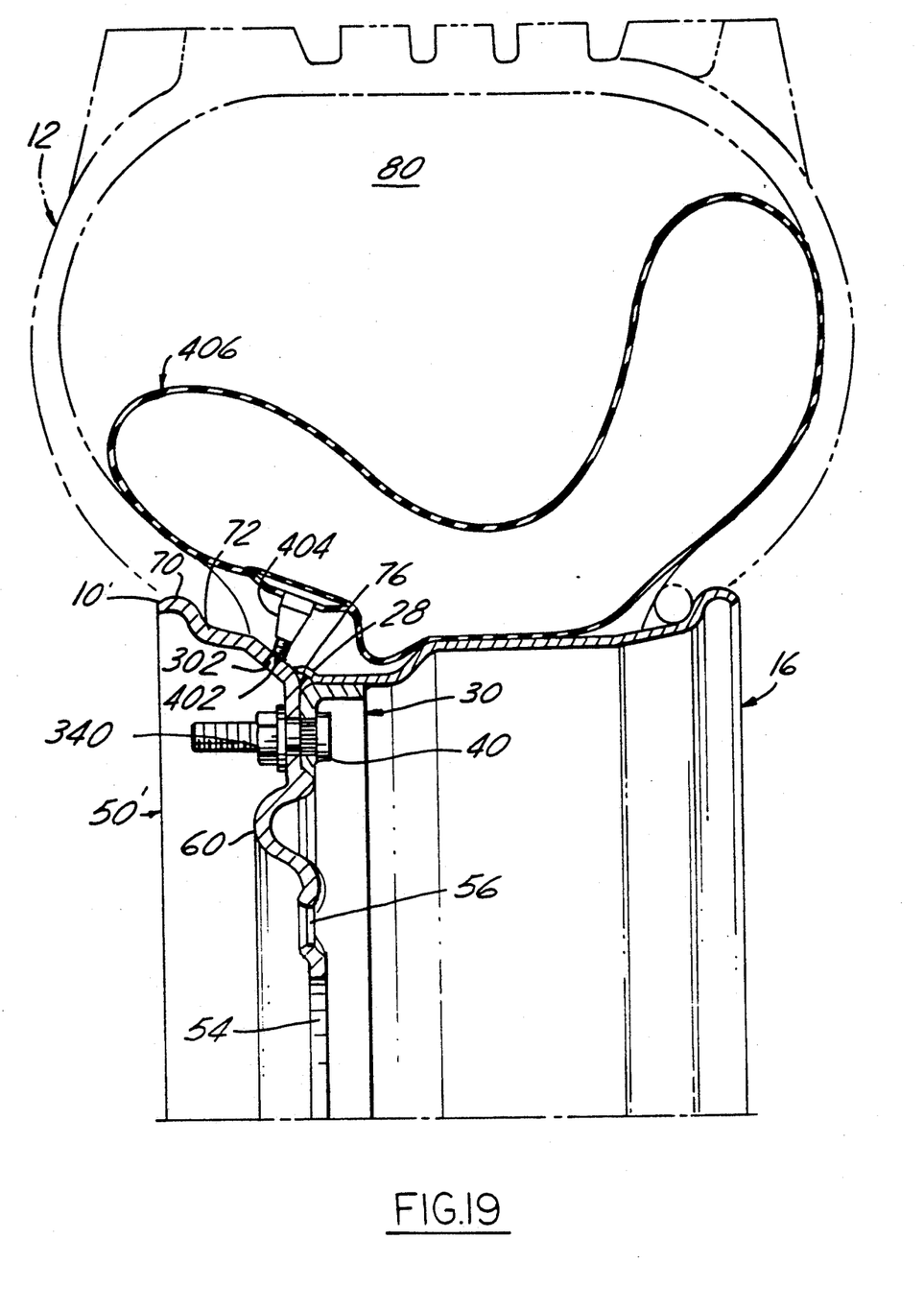
FIG. 19 is a duplicate of FIG. 10 but with parts 300, 340 and 356 removed and with a properly tire and load size-rated uninflated inner tube illustrated as being inoperably installed within tire 12 to further illustrate the anti-inner tube safety feature of the invention.

As illustrated in FIG. 19, to provide the anti-inner tube safety feature in the fourth embodiment air inflation coupling structure 300, dimension A of passageway 302 is preferably made as large as possible but usually slightly less than the previously described outside diametrical dimension found on or near the free end 402 of the inner tube inflation valve body 404 provided on an inner tube 406 properly sized for the particular size and load rating specified for wheel assembly 10' and tire 12. As described previously, for a wheel as specified hereinabove with respect to wheel assembly 10, such inner tube valves have been found to have a minimum outside diameter located at or near their free (inflation-opening) end 402 (externally threaded nipple end 402) of at least 0.305". Hence dimension A of passageway 302 may have a dimension of 0.300" this size wheel, provided the tolerances in this dimension do not overlap the tolerances of the minimum outside diameter of the free end of the inner tube valve. Hence when insert assembly 300 is removed from wheel 10', leaving passageway 302 exposed as shown in FIGS. 12-14, and FIG. 19 it is impossible to insert such an inner tube valve 404 through safety control passageway 302, thereby rendering wheel 10' anti-inner tube safe. It is to be understood, however, that safety control or blocking dimension A may even be slightly larger than such inner tube free end dimension, so long as it is small enough to prevent the free nipple end of the inner tube valve from reaching an operable access position at the weather side of disc 50.

The dimension B between the apices of external threads 326 and 328 (FIG. 15) is basically determined by the interior dimension C of counterbore 342. Dimension C is preferably correlated with dimension D so that the cross-sectional area of counterbore 342 is approximately equal to that of the cylindrical coupling control passageways 120 of the first and second embodiments, and/or disc control passageway 172 of the third embodiment which in turn have a flow cross-sectional area large enough to provide the volumetric air flow capacity required to allow inflation and deflation of tire 10 within a given maximum time period for the given volumetric and pressure conditions of the inflation specs of tire 12, and taking into account the characteristics of the air inflation sources customarily provided for inflating tire 12.

Once dimension C is so determined, dimension B will be made sufficiently larger than C as required to provide sufficient stock thickness in the threaded portions of shank 318 to meet strength (durability) requirements. With dimension B thus deterined, the dimension between the end corner surfaces 308 and 310 of passageway 302 can likewise be determined, i.e., made slightly larger than dimension B to provide a slight clearance to facilitate insertion of shank 318 in and out of through-passageway 302 for installing and removing body 400 on disc 50'.

In one successful working example of coupling 300 and disc control passageway 302 constructed for use with the wheel and tire specification and parameters previously set forth hereinabove, the following dimensions were utilized:

| | |
|---|---|
| Safety control dimension A of passageway 302 | 0.250" |
| Maximum passageway 302 dimension between end surfaces 308 and 310 | 0.510" |
| Dimension A' of shank 318 | 0.235" |
| Dimension B of shank 318 | 0.4947" |
| Dimension C of interior air flow passage 342 | 0.350" |
| Dimension D of interior air flow passage 342 | 0.155" |

Figures 11, 12, 13, 14:
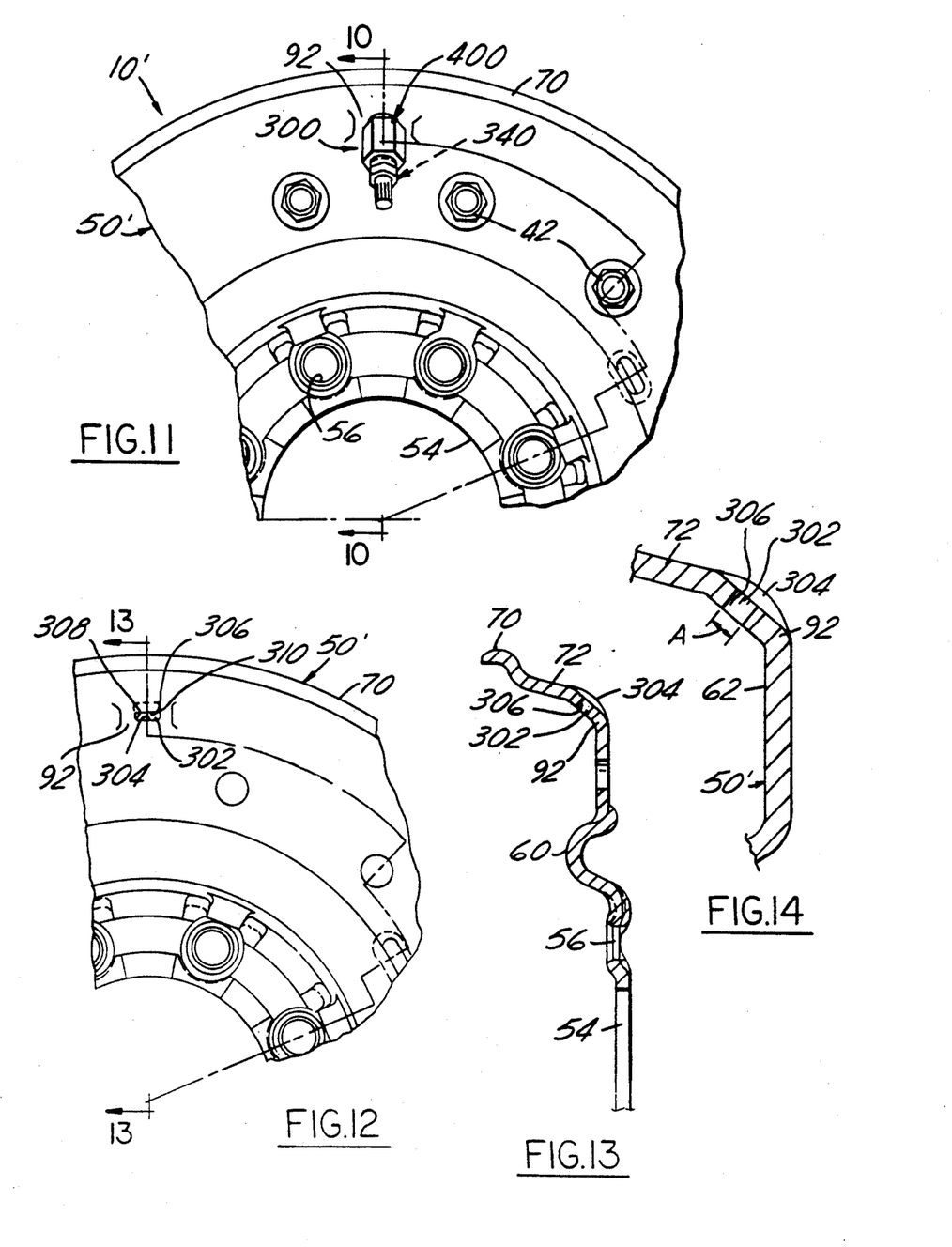
FIG. 11 is a fragmentary side elevational view of the wheel assembly of FIG. 10 without a showing of a tire thereon.
FIG. 12 is a fragmentary side elevational view of the disc part of the wheel assembly of FIGS. 10 and 11 shown by itself without the fourth embodiment tire inflation valve safety mounting structure mounted thereon.
FIG. 13 is a fragmentary cross-sectional view taken on the line 13—13 of FIG. 12.
FIG. 14 is a fragmentary cross-sectional view of a portion of the cross-sectional view of FIG. 13 but enlarged thereover.

As best seen in FIGS. 10 and 11, coupling 300 is disposed on the weather side of disc 50' with shank 318 extending through passageway 302 and single lock nut 356 threaded on shank 318 to tightly compress O-ring seal 334 against the weather side of the flat portion 92 of disc 50' to prevent air leakage from the tire cavity 80 via passage 302. The tank valve fitting 340 then may be screwed into the internal threads 338 of body member 400 to couple the interior air space 80 of tire 12 to the CTIS system of the vehicle to render wheel assembly 10' ready for use in military vehicles so equipped. Alternatively a standard commercial air inflation valve may be substituted for fitting 340 to render assembly 10' ready for use on commercial highway and off-highway vehicles.

The fourth embodiment coupling structure 300 and 302 thus provides an anti-inner tube safe take-apart wheel assembly in accordance with the invention which fullfills the aforestated objects and yet retains the advantages of removability, e.g., simple installation with hand tools and the other advantages of the prior art non-safe coupling 202 of FIG. 9. The large hexagonal portion 312 of body 400 easily receives an open-end wrench, as does the nut 356 or the alternative lock nuts 352 and 354 if the latter are used. Although body member 400 of assembly 300 is a more complex part than the parts 100, 130 and 150 of the first three embodiments, nevertheless the same is well-adapted to economical screw machine manufacture as a special fitting, and O-ring 334 as well as nuts 352, 354, and 356 are shelf-item parts. The cost of special piercing the oval safety control passageway 302 in disc 350' is essentially the same as the formation of the round opening 94 of FIGS.

3 and 4. Moreover, the welding operations involved in the first three embodiments are eliminated, as is any adverse effect such welding may have on the metallurgy of the material of disc 50' so that disc 50' may have a greater resistance to cyclical stress failure in operation.

As will now be apparent from the foregoing description, the invention contemplates means for inflating the inflation cavity 80 of tire 12 utilizing a safety air inflation valve coupling members and a cooperating portion of the disc in which either the coupling member or the disc itself has a through safety control passageway permanently interconnected with the disc. This permanent control passageway has a cross-sectional configuration sized and configured to prevent passage therethrough, at least to an access-operable position, of an air inflation valve provided on inner tube of sufficient size to fit within the tire cavity and capable when inflated of rendering the wheel and tire assembly normally operable for supporting its normal vehicle load in a run-mode of the vehicle. Hence the invention enables the take-apart tire and wheel assembly anti-inner tube to be made permanently safe for commercial vehicle use because the inner tube valve cannot be inserted through the control passageway of the coupling and disc cooperative inflation structure.

It is also to be understood that, although the foregoing description and drawings describe and illustrate in detail successful working embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

We claim:

1. A take-apart safety tire and wheel assembly comprising a vehicle wheel including a wheel rim having axially spaced bead flanges, and a rim base; a pneumatic tubeless tire having axially spaced bead toes and a circumferential tire tread spaced radially outwardly of said rim base to define a tire inflation chamber cavity; said wheel and tire being adapted to removably receive in said chamber a safety runflat insert means including an axially incompressible first portion adapted to extend circumferentially around said rim and having axially spaced side edges adapted to clamp said bead toes against said bead flanges, said wheel rim including means for inflating said tire cavity and means for preventing inflation of said tire cavity in the event of improper assembly of said safety tire and wheel assembly; said wheel rim comprising a first rim segment including one of said bead flanges, a second rim segment including the second of said bead flanges adapted to be axially assembled to said first rim segment, annular sealing means adapted to be disposed between opposing portions of said first and second rim segments and means for releasably clamping said second rim segment onto said first rim segment with said annular sealing means captured in compression between said portions of said rim segments for sealing said tire cavity, said means for preventing inflation comprising air bleed passage means in one of said first and second rim segments for venting said cavity to atmosphere in the event of loss of sealing engagement at said sealing means; said clamping means being adapted to engage and exert clamping stress on said second rim segment over a dimension in the axial direction of said first rim segment which is sufficient to permit loss of sealing pressure at said sealing means prior to loss of clamping engagement at said clamping means, permitting air leakage past said sealing means through said air bleed passage means to atmosphere, said means for inflating said tire cavity comprising a safety inflation valve coupling member operably coupled in air sealing relation to the one of said first and second rim segments facing outboard of said assembly when mounted on a vehicle, said member and said one rim segment each having a through passageway and means cooperable to form an interior air passage for communicating tire inflation means with said tire cavity, at least one of said through passageways being permanently connected to said one rim segment and having a safety control cross sectional configuration adapted to prevent passage therethrough of an air inflation valve provided on an inner tube of sufficient size to fit within said tire cavity and capable when inflated of rendering said wheel and tire assembly normally operable for supporting its normal vehicle load in a run-mode of the vehicle whereby such inner tube valve cannot be inserted through said one through passagway.

2. The wheel rim assembly set forth in claim 1 further comprising a wheel mounting disc integral with the one of said rim segments facing outboard of said assembly when mounted on a vehicle.

3. The wheel rim assembly of claim 1 wherein said through passageway in said one rim segment has an oval cross-sectional configuration defining said safety control cross-sectional configuration, and said coupling members comprises a fitting having a body with a protruding stem insertable with a close matching fit through said one rim segment through passageway so as to protrude into the tire interior cavity space of said wheel assembly, said fitting having through bore means defining said through passageway of said coupling member and defining said interior air passageway, and means for removably securing said fitting to said one rim segment.

4. The wheel assembly of claim 3 wherein said stem of said fitting has a bore of oval cross section forming part of said through bore means of said fitting, said oval cross section of said stem bore having a minimum transverse interior dimension of about 0.155 inches and a maximum transverse interior dimension of about 0.350 inches, said oval cross section of said one rim segment through passageway having a maximum transverse interior dimension of less than 0.305 inches.

5. The wheel assembly of claim 3 wherein said stem has an oval external cross-sectional configuration defined by parallel flat sides and rounded ends and being dimensioned to have a close sliding fit through said oval through passageway of said one rim segment, said stem rounded ends being externally threaded for threadably receiving threaded fastener means thereon to thereby serve with said stem a said fitting removable securing means.

6. The wheel assembly of claim 5 wherein said fitting body has a hexagonal external configuration to serve as a nut surface for a wrench.

7. A wheel rim and disc assembly for use in a safety tire and wheel assembly which includes a pneumatic tubeless tire, said wheel rim and disc assembly comprising:

an inboard rim part including a rim base and an inboard tire bead retaining flange integrally carried at an inboard edge of said rim part, said inboard rim part having a generally cylindrical band terminating at an outboard free edge of said rim base remote from said inboard flange of said inboard rim part, a wheel mounting ring having an outer marginal axially extending flange telescoped into and secured to said cylindrical band, said ring having a radially inwardly extending flange having an outer surface extending generally co-planar with said inboard rim part free edge, a demountable outboard rim part comprising a central wheel mounting portion and an outboard tire bead retaining flange integrally projecting from an outboard edge of said wheel mounting portion, annular resilient sealing means disposed between three sealing surfaces comprising an outboard sealing surface of said wheel mounting ring, an inboard sealing surface of said outboard rim part and a radially inwardly facing sealing surface on said rim base band free edge of said inboard rim part, and means for axially clamping said outboard rim part on said inboard rim part with said sealing means being captured in compression between said aforementioned three sealing surfaces so as to seal against air leakage from the internal cavity of a tire when mounted on said wheel rim and disc assembly, said wheel rim and disc assembly having air bleed means normally sealed from the tire cavity by said sealing means, said clamping means being constructed and adapted to engage and exert clamping stress on said outboard rim part over a range of relative movement therebetween in the axial direction of said inboard rim part which is sufficient to permit loss of sealing pressure at said sealing means prior to loss of clamping engagement at said clamping means to thereby permit air leakage past said sealing means through said air bleed means to atmosphere within said range or relative movement, said first, second and third sealing surfaces when juxtaposed to sealably compress said sealing means thereby defining an annular cavity which in radial cross-section generally defines a triangle, said sealing means being bodily movable along said mounting ring sealing surface axially of said wheel assembly by tire internal cavity air pressure upon mutual separation of said sealing surface of said outboard rim part from said mounting ring and inboard rim part sealing surfaces in response to said relative separational movement of said rim parts, and means for inflating said tire cavity comprising an inflation valve coupling member operably coupled in air sealing relation to the one of said first and second rim segments facing outboard of said assembly when mounted on a vehicle, said member and said one rim segment each having a through passageway and being cooperable to together form an interior air passage adapted to communicate tire inflation means with the inflation chamber cavity of a tubeless tire when mounted on said rim and disc assembly, at least one of said through passageways being permanently connected to said one rim segment and having a cross sectional configuration adapted to prevent passage therethrough of an air inflation valve provided on an inner tube of sufficient size to fit within the tire cavity and capable when inflated of rendering said wheel and tire assembly normally operable for supporting its normal vehicle load in a run-mode of the vehicle whereby such inner tube valve cannot be inserted through said one through passageway.

8. The wheel rim assembly as set forth in claim 7 wherein said ring outer marginal flange is press fit into said cylindrical band of said inboard rim part and secured thereto a circumferential weld at the junction of an axially inboard edge of said ring marginal flange and the juxtaposed adjacent inner surface of said cylindrical band of said inboard rim part.

9. The wheel assembly as set forth in claim 7 wherein said rim base and inboard tire bead retaining flange have a uniform stock thickness less than the stock thickness of said outboard rim part.

10. The wheel assembly as set forth in claim 9 wherein said cylindrical hoop of said inboard rim part has a sliding fit as telescopically received onto said outer marginal flange of said mounting ring.

11. A take-apart wheel rim assembly for use in a safety tire and wheel assembly which includes a pneumatic tubeless tire having a tire inflation chamber cavity, said wheel rim assembly comprising:

rim base means including a rim base, a tire bead retaining flange integrally carried at an inboard edge of said rim base and a cylindrical band at a flange-remote edge of said rim base, demountable disc and flange means including a wheel mounting disc adapted to be detachably received from an axially outboard direction against vehicle wheel mounting structure and outboard bead retaining flange means integrally projecting from an outer peripheral edge of said disc, annular resilient sealing means disposed between said sealing surface of said demountable disc and flange means and an opposing sealing surface of said rim base means, means for axially clamping said demountable flange and disc means on said rim base means with said sealing means being captured in compression between said sealing surfaces so as to seal against air leakage from the tire inflation chamber cavity of a tubeless tire when mounted on said rim assembly, air bleed passage means in said band outboard of sealing means and normally sealed from the tire cavity by said sealing means, said clamping means being constructed and adapted to engage and exert clamping stress on said demountable flange means over a range of relative movement therebetween in the axial direction of said rim base means which is sufficient to permit loss of sealing pressure at said sealing means prior to loss of clamping engagement at said clamping means and thereby permitting air leakage past said sealing means through said air bleed passage means to atmosphere within said range of relative movement, and means for inflating said tire cavity comprising a safety inflation valve coupling member operably coupled in air sealing relation to said demountable disc and flange means and facing outboard of said assembly when mounted on a vehicle, said member and said disc and flange means each having a through passageway and being cooperable to together to form an interior air passage for communicating tire inflation means with said tire cavity, at least one of said through passageways being permanently connected to said disc and flange means and having a cross sectional configuration adapted to prevent passage therethrough of an air inflation valve provided on an inner tube of sufficient size to fit within said tire cavity and capable when inflated of rendering said wheel and tire assembly normally operable for supporting its normal vehicle load in a run-mode of the vehicle whereby such inner tube valve cannot be inserted through said one through passageway.

12. The wheel rim assembly set forth in claim 11 wherein said sealing surface of said disc and flange means defines a radially extending planar surface for abutting flatwise and sealably engaging said sealing means, said sealing means protruding axially in an outboard direction from said rim base means for accommodating dimensional variations in said tire bead toes, rim base means and demountable flange means.

13. The wheel rim assembly set forth in claim 12 wherein said rim base means comprises a wheel mounting ring secured to and disposed radially inwardly of said rim base.

14. A wheel rim assembly as set forth in claim 13 wherein said clamping means comprises first threaded means carried by said wheel mounting ring and second threaded means disposed outboard of said disc and flange means and adapted to be received by said first threaded means, said first and second threaded means being dimensioned in the axial direction of said rim base means sufficiently to permit loss of sealing engagement at said sealing means prior to loss of threaded engagement at said threaded means upon loosening of said threaded means.

15. The wheel rim assembly as set forth in claim 12 wherein said air bleed means comprises an external shoulder radius on said mounting ring radially juxtaposed to said third sealing surface of said inboard rim part, said annular resilient means being displaceable by tire interior air pressure axially along said ring outer surface onto said ring shoulder radius to thereby lose sealing engagement with said sealing surfaces as said clamping means are loosened but still interengaged and thereby allow flexure and/or warpage of said demountable outboard rim part in response to tire bead lateral expansion forces exerted by the tire interior cavity air pressure.

16. The wheel rim assembly as set forth in claim 15 wherein said respective mounting ring and inboard rim part first and third sealing surfaces are each inclined radially in opposite directions relative to the rotational axis of said wheel rim and disc assembly in divergent relationship to one another and said second sealing surface of said outboard rim part extends generally radially of said assembly such that the three of said sealing surfaces thereby define an annular cavity which in radial cross-section defines a generally equilateral triangle.

17. The wheel assembly of claim 11 wherein said through passageway in said one rim segment comprises a tubeless tire inflation valve stem hole therein approximately 0.450 inches in diameter, said coupling member comprising a hollow body open at both ends and having a neck portion inserted with a close fit through said valve stem hole, and wherein said interior air passage comprises said through passageway in said coupling member and said cross-sectional configuration is defined by the interior dimension of said neck portion, said minimum cross-sectional dimension of said interior air passage of said coupling member being about 0.250 inches.

18. The wheel rim assembly of claim 11 wherein said one rim segment and said safety inflation valve coupling member are permanently joined together by a welded connection, said through passageway of said one rim segment comprising a hole through said one rim segment having a diameter defining said cross-sectional configuration and said interior air passage, said coupling member comprising a sleeve having a through bore therein defining said through passageway of said coupling member and being of larger diameter than said hole in said one rim segment and communicating therewith, said coupling sleeve having means adapted for detachable connection to the tire inflation means exteriorly of the outboard side of said wheel rim assembly.

19. The wheel rim assembly of claim 18 wherein said coupling sleeve is resistance welded to said one rim segment and said one rim segment hole and said sleeve bore are coaxially aligned.

20. The wheel rim assembly as set forth in claim 18 or 19 wherein said one rim segment hole and said sleeve bore are formed after said coupling sleeve is welded to said one rim segment.

21. A method of constructing a take-apart wheel rim assembly for use in a safety tire and wheel assembly which includes a pneumatic tubeless tire having a tire inflation chamber cavity, said wheel rim assembly comprising:

rim base means including a rim base, a tire bead retaining flange integrally carried at an inboard edge of said rim base and a cylindrical band at a flange-remote edge of said rim base, demountable disc and flange means including a wheel mounting disc adapted to be detachably received from an axially outboard direction against vehicle wheel mounting structure and outboard bead retaining flange means integrally projecting from an outer peripheral edge of said disc, annular resilient sealing means disposed between said sealing surface of said demountable disc and flange means and an opposing sealing surface of said rim base means, means for axially clamping said demountable flange and disc means on said rim base means with said sealing means being captured in compression between said sealing surfaces so as to seal against air leakage from the tire inflation chamber cavity of a tubeless tire when mounted on said rim assembly, air bleed passage means in said band outboard of sealing means and normally sealed from the tire cavity by said sealing means, said clamping means being constructed and adapted to engage and exert clamping stress on said demountable flange means over a range of relative movement therebetween in the axial direction of said rim base means which is sufficient to permit loss of sealing pressure at said sealing means prior to loss of clamping engagement at said clamping means and thereby permitting air leakage past said sealing means through said air bleed passage means to atmosphere within said range of relative movement, and means for inflating said tire cavity comprising a safety inflation valve coupling member operably coupled in air sealing relation to said demountable disc and flange means and facing outboard of said assembly when mounted on a vehicle, said member and said disc and flange means each having a through passageway and being cooperable to together to form an interior air passage for communicating tire inflation means with said tire cavity, at least one of said through passageways being permanently connected to said disc and flange means and having a cross sectional configuration adapted to prevent passage therethrough of an air inflation valve provided on an inner tube of sufficient size to fit within said tire cavity and capable when inflated of rendering said wheel and tire assembly normally operable for supporting its normal vehicle load in a run-mode of the vehicle whereby such inner tube valve cannot be inserted through said one through passageway, said method comprising the steps of:

(1) providing said one rim segment with an imperforate flat portion located in a zone to communicate with the inflation chamber cavity of a tubeless tire to be mounted on the wheel rim assembly, (2) providing an inflation coupling member preform comprising a cylindrical solid body having a flat end face at one end thereof, (3) forcing said flat end face of said preform against a flat outboard surface of said flat portion of said one rim segment, (4) applying resistance welding current and pressure through said preform and said flat portion of said one rim segment to resistance weld said preform to said flat portion of said one rim segment, and (5) thereafter forming a hole in aid one rim segment through said flat portion thereof and forming a counterbore in said coupling member to thereby provide said safety inflation valve coupling means wherein said rim segment hole defines said cross-sectional configuration and said portion of said interior air passage and said preform is finished into a coupling sleeve.

22. The method as set forth in claim 21 wherein said one rim segment hole and said coupling bore are formed by first drilling coaxially through said coupling member and through said flat portion of said one rim segment to finish form said hole in said one rim segment to the final interior dimension of said interior air passage, then counterboring said coupling preform coaxially with said rim segment hole to form said coupling sleeve bore to larger diameter than said rim segment hole, and then tapping said coupling in said bore to form threads for detachably threadably receiving a corresponding male threaded part of the tire inflation means.

23. The method as set forth in claim 21 further comprises forming said preform as a cylindrical body having a frusto conical portion at one end thereof such that said flat end face is smaller in diameter than the diameter of the cylindrical body of said coupling member.

24. The method as set forth in claim 23 wherein said frusto conical portion of said preform provides sacrificial metal for forming said resistance weld.

25. The method as set forth in claim 24 wherein said preform has a pilot hole formed in an end face thereof opposite said one end face, and said hole in said one rim segment is formed by inserting a drill bit into said pilot hole of said preform and drilling through said preform and thence said rim segment with said drill bit sized to form the final interior dimension of said hole in said one rim segment, and wherein the drill-formed passage through said preform is then reemed to form a counterbore therein defining said bore of said coupling member.

26. A take-apart safety tire and wheel assembly comprising a vehicle wheel including a wheel rim having axially spaced bead flanges and a rim base adapted for receiving thereon a pneumatic tubeless tire having axially spaced bead toes and a circumferential tire tread spaced radially outwardly of said rim base to define a tire inflation chamber cavity; said wheel rim comprising a first rim segment including one of said bead flanges, a second rim segment including the second of said bead flanges adapted to be axially assembled to said first rim segment, annular sealing means adapted to be disposed between opposing portions of said first and second rim segments and means for releasably clamping said second rim segment onto said first rim segment with said annular sealing means captured in compression between said portions of said rim segments for sealing said tire cavity, and means for inflating said tire cavity comprising a safety inflation valve coupling member operably coupled in air sealing relation to the one of said first and second rim segments facing outboard of said assembly when mounted on a vehicle, said member and said one rim segment each having a through passageway and together forming an interior air passageway for communicating tire inflation means with said tire cavity, at least one of said through passageways being permanently connected to said one rim segment and having a safety control cross sectional configuration adapted to prevent passage therethrough of an air inflation valve provided on an inner tube of sufficient size to fit within said tire cavity and capable when inflated of rendering said wheel and tire assembly normally operable for supporting its normal vehicle load in a run-mode of the vehicle whereby such inner tube valve cannot be inserted through said one through passagway.

27. The wheel assembly of claim 26 wherein said through passageway in said one rim segment has an oval cross-sectional configuration defining said safety control cross-sectional configuration, and said coupling member comprises a fitting having a body with a protruding stem insertable with a close matching fit through said one rim segment through passageway so as to protrude into the tire interior cavity space of said wheel assembly, said fitting having through bore means defining said through passageway of said coupling member and defining said interior air passageway, and means for removably securing said fitting to said one rim segment.

* * * * *